(12) United States Patent
Su et al.

(10) Patent No.: US 10,266,617 B2
(45) Date of Patent: Apr. 23, 2019

(54) CATIONIC COPOLYMER AND USE THEREOF IN LOST CIRCULATION ADDITIVE

(71) Applicants: CHINA PETROLEUM & CHEMICAL CORPORATION, Beijing (CN); CHINA PETROLEUM & CHEMICAL CORPORATION EXPLORATION & PRODUCTION RESEARCH INSTITUTE, Beijing (CN)

(72) Inventors: Changming Su, Beijing (CN); Mengyun Zhao, Beijing (CN); Jianzheng Su, Beijing (CN); Rusheng Zhang, Beijing (CN); Qiulian Long, Beijing (CN); Suobing Zhang, Beijing (CN); Danian Zhang, Beijing (CN); Chenggang Zheng, Beijing (CN); Yusheng Ma, Beijing (CN)

(73) Assignees: CHINA PETROLEUM & CHEMICAL CORPORATION, Beijing (CN); CHINA PETROLEUM & CHEMICAL CORPORATION EXPLORATION & PRODUCTION RESEARCH INSTITUTE, Beijing (CN)

( * ) Notice: Subject to any disclaimer, the term of this patent is extended or adjusted under 35 U.S.C. 154(b) by 315 days.

(21) Appl. No.: 14/911,369

(22) PCT Filed: Oct. 25, 2013

(86) PCT No.: PCT/CN2013/085964
§ 371 (c)(1),
(2) Date: Feb. 10, 2016

(87) PCT Pub. No.: WO2015/021694
PCT Pub. Date: Feb. 19, 2015

(65) Prior Publication Data
US 2016/0200848 A1    Jul. 14, 2016

(30) Foreign Application Priority Data
Aug. 14, 2013 (CN) .......................... 2013 1 0354270

(51) Int. Cl.
*C09K 8/035* (2006.01)
*C08F 4/40* (2006.01)
(Continued)

(52) U.S. Cl.
CPC ................. *C08F 4/40* (2013.01); *C08F 4/38* (2013.01); *C08F 12/26* (2013.01); *C08F 220/54* (2013.01); *C08F 220/56* (2013.01); *C09K 8/035* (2013.01); *C09K 8/426* (2013.01); *C09K 8/44* (2013.01); *C09K 8/512* (2013.01)

(58) Field of Classification Search
CPC ................. C08F 220/56; C08F 212/14; C08F 2220/1825; C08F 220/34; C08F 12/26;
(Continued)

(56) References Cited

U.S. PATENT DOCUMENTS

2010/0000735 A1* 1/2010 Weaver ............... C08B 37/0096
166/280.2
2010/0204068 A1* 8/2010 Kesavan ............. C08B 37/0096
507/211
(Continued)

FOREIGN PATENT DOCUMENTS

| CN | 1069755 A | 3/1993 |
|----|-----------|--------|
| CN | 1548498 A | 11/2004 |

(Continued)

OTHER PUBLICATIONS

International Search Report (PCT/ISA/210) dated Jun. 11, 2014, by the State Intellectual Property Office of China as the International Searching Authority for International Application No. PCT/CN2013/085964.

(Continued)

*Primary Examiner* — Alicia Bland
(74) *Attorney, Agent, or Firm* — Buchanan Ingersoll & Rooney PC

(57) ABSTRACT

A cationic copolymer represented by the following formula (I) has a viscosity average molecular weight in a range from 2 million to 10 million. In the cationic copolymer, the mole fractions of three structural units corresponding to three monomers are as follows: x being in a range from 0.01 to 20%, y being in a range from 0 to 15%, and z=1−x−y. When used in the construction of leaking stoppage in an oil well, a cationic chemical lost circulation additive prepared with the cationic copolymer is mixed with an anionic drilling fluid in a section of the wellbore where lost circulation occurs. Then neutral reaction and cross linking reaction occur, so that the viscosity of the resulting mixture rapidly increases to form a space grid structure. This blocks off the leakage path, and thus effects on efficient leaking stoppage in a short time period.

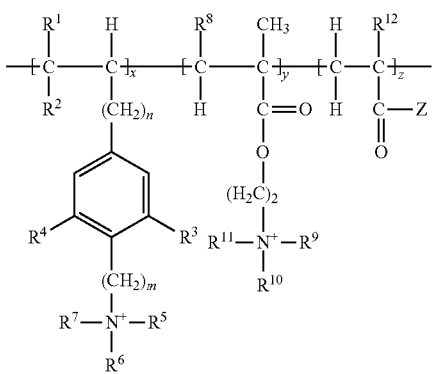

21 Claims, No Drawings

(51) Int. Cl.
*C08F 220/54* (2006.01)
*C08F 220/56* (2006.01)
*C09K 8/44* (2006.01)
*C08F 12/26* (2006.01)
*C08F 4/38* (2006.01)
*C09K 8/42* (2006.01)
*C09K 8/512* (2006.01)

(58) Field of Classification Search
CPC . C08F 220/54; C08F 4/38; C08F 4/40; C09K 8/035; C09K 8/426; C09K 8/44; C09K 8/512
See application file for complete search history.

(56) References Cited

U.S. PATENT DOCUMENTS

| 2012/0157353 | A1* | 6/2012 | Breeden | C09K 8/24 507/119 |
|---|---|---|---|---|
| 2014/0316092 | A1 | 10/2014 | Wang et al. | |
| 2015/0065672 | A1 | 3/2015 | Wang et al. | |

FOREIGN PATENT DOCUMENTS

| CN | 1583573 | A | 2/2005 |
|---|---|---|---|
| CN | 100556979 | C | 1/2009 |
| CN | 101586023 | B | 7/2010 |
| CN | 102382242 | A | 3/2012 |
| CN | 102432749 | A | 5/2012 |
| CN | 102127403 | B | 1/2013 |
| CN | 101955763 | B | 3/2013 |

OTHER PUBLICATIONS

The Search Report dated Dec. 23, 2015, in corresponding Chinese Application No. CN 201310354270.8.

Notification of Transmittal of the International Search Report and the Written Opinion of the International Searching Authority, and the Written Opinion (Forms PCT/ISA/220 and PCT/ISA/220) dated Jun. 11, 2014, by the State Intellectual Property Office of People's Republic of China in corresponding International Application No. PCT/CN2013/085964 (8 pages).

* cited by examiner

CATIONIC COPOLYMER AND USE THEREOF IN LOST CIRCULATION ADDITIVE

TECHNICAL FIELD

The present disclosure relates to the field of oil drilling, and specifically to a cationic copolymer and use thereof in a lost circulation additive.

TECHNICAL BACKGROUND

Loss of drilling fluids (lost circulation) is a technical problem in petroleum engineering which is ubiquitous in the procedure of oil drilling and has not been completely solved yet. Especially, serious leakage formations, such as lower pressure formation, fracture formation and cavernous formation are often encountered during the drilling constructions of deep wells or drilling constructions in complex formations. According to incomplete statistics, China spends RMB 200 million each year on treating lost circulation. Consequently, developing a convenient and effective leakage stoppage technology used in oil drilling, or providing an efficient and practical lost circulation additive will bring about good economic benefits and social benefits.

During the drilling procedure, when a drilling rig collides with a high-permeability formation especially a formation having a developing fracture or a larger cavern, more serious problem of lost circulation often happens. Currently, after lost circulation in the procedure of oil drilling occurs, measures of stopping circulation of the drilling fluid, tripping out the drilling rig, and performing leaking stoppage constructions under static conditions are typically taken. Specifically, bridging granular materials or chemical lost-circulation materials like cement slurry and urea formaldehyde resin are generally used for stopping lost circulation. With respect to lost circulation caused by a high-permeability formation, the technical requirements of drilling construction can generally be met by the use of bridging materials. However, generally, in the case of severe lost circulation caused by the situations that a drill rig encounters a pressure-sensitive formation, a big fracture, or a cave and the like, the first-time success rates of leaking stoppage with bridging materials or chemical lost-circulation materials in the prior art are low, along with the frequent occurrence of repeated leaking stoppage. For example, when using cement slurry for leaking stoppage, a cement slurry is mixed and diluted with formation water (or a drilling fluid), which often leads to the phenomenon that the cement slurry fails to concrete.

At present, lost circulation additives for well drilling mainly fall into several categories such as solid particles, fiber, inorganic gel, and anionic polymer gel and so on. CN100556979C discloses a self-cementing lost circulation additive for well drilling and preparation method thereof. Such lost circulation additive stop the lost circulation of well drilling by using inorganic particles and inorganic gel as the lost circulation additive, specifically using bauxite, limestone, and gypsum as raw materials. CN102127403B discloses a lost circulation additive for welling drilling which is prepared by uniformly mixing walnut shell powder, sawmilling powder, cotton seeds, husk powder, active blocking agent and elastic rubber particles, etc. The formulation types thereof are varied. CN101955763B discloses a high-pressure resisting lost circulation additive, which is comprised of soybean granules, walnut shell powder, vermiculite, peanut shell powder, cement and a flocculating agent (an anionic polymer) used for a drilling fluid. This lost circulation additive performs leaking stoppage by utilizing bridging between a chemical agent and a particulate matter, the construction procedure of which is more complicated. CN101586023B discloses a pre-crosslinked gel lost circulation additive for well drilling and preparation method thereof, comprising the steps of mixing acrylamide, acrylic acid, cationic monomer, cross-linking agent and an initiator above the ground, and performing cross-linking polymerization under protection of nitrogen, to give an indiscerptible, and swelling pre-crosslinked gel lost circulation additive having the expandable characteristics, wherein the used cationic monomer is dimethyl diallyl ammonium chloride, methacryloyloxyethyl trimethyl ammonium chloride, or acryloyloxyethyl trimethyl ammonium chloride. After this lost circulation additive is injected below ground, plugging is performed depending on continuous expansion of polymer particles. This lost circulation additive is capable of playing a favourable effect of leakage stoppage by means of swelling characteristics, but the preparation thereof is relatively complicated, for it not only needs to be polymerized under the protection of nitrogen above the ground before use, but also has continuous swelling action, thus restricting the time of use to some extent.

In addition, resin chemical agents such as urea formaldehyde, phenolic aldehyde and the like can also be used for plugging in field constructions. There are the following problems in these constructions. First, the cost of urea formaldehyde is relatively high. The construction is full of difficulty. When being contaminated by a drilling fluid, or when the environment temperature changes, concretion of the lost circulation additive of urea formaldehyde will be difficult, which leads to a low success rate of plugging.

Therefore, the present disclosure aims to develop a cationic copolymer and a lost circulation additive formed by the cationic copolymer, and to provide an effective new method for drilling plugging.

The cationic copolymer is a binary/multi copolymer containing a cationic unit and a non-cationic unit, and can be prepared through two methods substantially, including cationic modification of a polymer and copolymerization of a non-cationic monomer with a cationic monomer. Taking preparation of cationic polyacrylamide for example, cationic modification thereof comprises introducing an amine molecule to a polyacrylamide molecule by means of a Mannich reaction, followed by quaternarization to produce a cationic copolymer. The amines commonly used for such modification are dimethylamine, diethylamine, trimethylamine, and the like. Although the technical procedure is simple and easy to operate, through cationic modification, only products of a low cationic degree can be obtained, and insoluable polymers can be generated easily in the course of production, which will affect performance of the product. At present, copolymerization of a non-cationic monomer and a cationic monomer is generally used in preparing cationic copolymers.

In order to obtain a cationic copolymer of a specific use, copolymerization of a non-cationic monomer and a cationic monomer is generally used. Currently, cationic polyacrylamide and derivatives thereof are most widely prepared among all cationic copolymers. Based on the reaction mechanism that copolymerization of monomers is triggered by free radicals, the preparation method thereof comprises selecting comonomers, and determining an optimal copolymerization reaction system and procedure conditions of polymerization, so as to prepare the desired polymer. The commonly used cationic monomers in synthesis are diallyl dimethyl ammonium chloride, methacryloyloxyethyltrimethyl ammonium chloride, acryloyloxyethyl trimethyl ammonium chloride and the like.

For example, polydiallyl dimethyl ammonium chloride which is prepared by the copolymerization of diallyl dimethyl ammonium chloride and acrylamide or acrylate is a water-soluable cationic copolymer, often used as a flocculant and has a number advantages like high positive charge density, good water solubility, non-toxic, as well as low costs. It is widely used in the fields of sewage treatment in oil exploitation, papermaking, and textile dying, etc. As the relative molecular mass of the homopolymer of diallyl dimethyl ammonium chloride is low, copolymerization between diallyl dimethyl ammonium chloride and a non-cationic monomer is generally used.

By adopting inverse emulsion copolymerization, researchers have prepared polydimethyl diallyl ammonium chloride/acrylamide cationic flocculants, which has a number of advantages such as high relative molecular mass of polymers, good water-solubility, a lower content of remaining monomer. There are researchers who have used acrylamide and acryloyloxyethyl trimethyl ammonium chloride as monomers to perform aqueous adiabatic polymerization, and thus prepare a cationic polyacrylamide with relative molecular mass greater than 10,000,000. The flocculation and settling test of the product on the grey water of a paper-making factory indicates that its performance overmatches that of commonly used anionic flocculants. In treating washing and bleaching effluent, cationic flocculants has the effects of both charge neutralization, and adsorption and bridging, and the increase of the relative molecular mass thereof can improve adsorption and bridging, increase articulate size, and thus make for the flocculation and settling.

In the prior art, a chemical lost circulation additive obtained from a cationic copolymer has some effects in plugging when being used in field practice, hut also shows low plugging efficiency, weak stoppage intensity, and a short valid period of plugging in complex formations. The main reasons as to why the success rate of the conventional plugging technology in drilling engineering is low are as follows. The cationic degree of the cationic lost circulation additive is relatively low, and the synergistic action between the cationic lost circulation additive and the drilling fluid is relatively weak, and thus the variation in viscosity is small after the cationic lost circulation additive is mixed with the drilling fluid, thereby failing to significantly improve the flow resistance of the lost circulation additive. This prevents the lost circulation additive from remaining and curing effectively in a target zone such as fissure, hole and the like, thus leading to poor plugging effects. When the existing technique of leakage stoppage in well drilling is used, in the event of serious lost circulation, from hundreds to thousands of cubic meters of a lost circulation additive is typically used for construction, which not only increases costs of drilling well, but also leads to serious damage to the production capacity of oil-gas well. Therefore, developing a new cationic copolymer with wide adaptability, fast blocking speed, and high intensity, as well as a new chemical leakage stoppage, is a vital research direction in the field of oil drilling.

SUMMARY OF THE INVENTION

The present disclosure provides a cationic copolymer represented by the following structure formula, having a viscosity average molecular weight in a range from 2 million to 10 million, preferably from 4 million to 8 million,

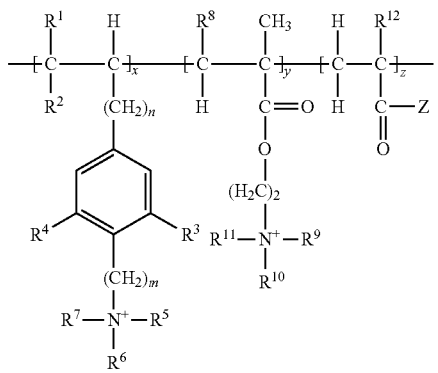

wherein $R^1$ and $R^2$ are each independently selected from H and $CH_3$; $R^3$ and $R^4$ are each independently selected from a group consisting of H, $C_1$-$C_4$ alkyl, $NH_2$, OH, and $OCH_3$; $R^5$, $R^6$ and $R^7$ are each independently selected from $C_1$-$C_2$ alkyl, and at least one of $R^5$, $R^6$ and $R^7$ is $CH_3$; n is selected from 0, 1, 2, and 3, and m is selected from 1, 2, 3, and 4; $R^8$ is H or $CH_3$; $R^9$, $R^{10}$, and $R^{11}$ are each independently selected from $C_1$-$C_2$ alkyl, and at least one of $R^9$ to $R^{11}$ is $CH_3$; $R^{12}$ is H or a $C_1$-$C_4$ alkyl; Z is $OR^{13}$ or $NR^{14}R^{15}$, and $R^{13}$, $R^{14}$, and $R^{15}$ are each independently selected from H and $C_1$-$C_4$ alkyl; and wherein in the cationic copolymer, the mole fractions of three structural units corresponding to three monomers are as follows: x is in a range from 0.01 to 20%, y is in a range from 0 to 15%, z=1−x−y.

In the formula of the cationic copolymer according to the present disclosure, x, y, and z are the mole fractions of the structural units corresponding to monomers (a), (b), and (c) in the copolymer, respectively. One skilled in the art will understand that, the connection manners between and among the structural units corresponding to monomers (a), (b) and (c) in the above formula (I) involve not only such sequential connection as (a)-(b)-(c), but also other sequential connection manners such as (b)-(a)-(c). The cationic copolymer of the present disclosure contains a certain content of benzene rings, which can significantly increase the rigidity of the polymer chain. In the present disclosure, y can be zero. That is, the copolymer may be free of the structural unit corresponding to monomer (b).

In one specific embodiment, the zeta potential of a solution formed by the copolymer in deionized water and having a concentration of 1 wt % is in orange from 10 to 30 mv. In the present disclosure, the copolymer obtained by the free radical polymerization of a cationic-containing monomer and a non-cationic monomer comprises a cationic group, and thus is termed as a cationic copolymer.

Preferably, in the formula of the above copolymer, y is in a range of 0.01-12%.

In one specific embodiment, the copolymer is prepared by block copolymerizing cationic monomer (a), non-cationic monomer (c), and optionally cationic monomer (b), and a haloid of cationic monomer (a) is shown as formula (I):

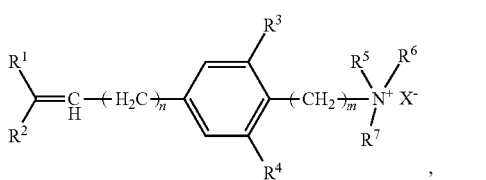

wherein X is selected from F, Cl, Br, and I.

Preferably, in the present disclosure, the compound as shown in formula (I) is at least one selected from the group consisting of p-propenylbenzyldimethylethyl ammonium chloride, p-vinyl-2,6-dimethylbenzyldimethylethyl ammonium chloride, p-methylpropenylbenzyltrimethyl ammonium chloride, p-methylpropenylbenzylmethyldiethyl ammonium chloride, N,N,N-trimethyl-2-(2-amino-4-(2-methyl-1-propenyl)-6-hydroxybenzene)ethyl ammonium chloride, N,N,N-trimethyl-3-(2-amino-4-(2-methyl-1-propenyl)-6-hydroxybenzene)propyl ammonium chloride, N,N,N-trimethyl-2-(2,6-dihydroxy-4-(2-methyl-1-propenyl)benzene)ethyl ammonium chloride, N,N,N-trimethyl-2-(2-methoxy-4-(2-methyl-1-propenyl)-6-hydroxybenzene)ethyl ammonium chloride, N,N,N-trimethyl-2-(2-propyl-4-(2-methyl-1-propenyl)-6-hydroxybenzene)ethyl ammonium chloride, N,N,N-trimethyl-2-(2-ethyl-4-(2-methyl-1-propenyl)-6-hydroxybenzene)ethyl ammonium chloride, N,N,N-trimethyl-3-(2-ethyl-4-(2-methyl-1-propenyl)-6-hydroxybenzene)propyl ammonium chloride, and N,N,N-methyldiethyl-3-(2-ethyl-4-(2-methyl-1-propenyl)-6-hydroxybenzene)propyl ammonium chloride.

Preferably, a haloid of said cationic monomer (b) is shown as formula (II):

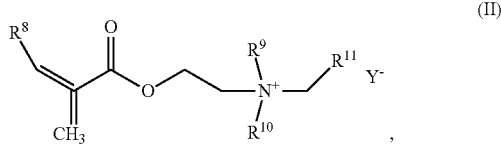

wherein Y is selected from the group consisting of F, Cl, Br, and I.

The compound of formula (II) is at least one selected from the group consisting of methylbutyryloxyethyltrimethyl ammonium chloride, methylacryloxyethyltrimethyl ammonium chloride, and methylacryloxyethylmethyldiethyl ammonium chloride.

Preferably, the non-cationic monomer is shown as formula (III):

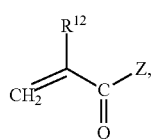

wherein the non-cationic monomer is at least one selected from the group consisting of acrylamide, N,N-dimethylacrylamide, N,N-methylethylacrylamide, acrylic acid, tert-butyl acrylate, methyl methacrylate, and tert-butyl methacrylate.

In another specific embodiment, the non-cationic monomer comprises at least one non-cationic monomer (c1) in which Z is $OR^{13}$, and at least one non-cationic monomer (c2) in which Z is $NR^{14}R^{15}$, and non-cationic monomer (c1) is equal to or less than 50% by weight of all non-cationic monomers. According to this specific embodiment, through copolymerization of two or more non-cationic monomers with the cationic monomer of the present disclosure, a cationic copolymer with a larger molecular weight can, for example, be formed.

The present disclosure further provides a method for preparing the above-mentioned copolymer, comprising pre-polymerizing monomer (a) and optional monomer (b), and monomer (c), so as to form a prepolymer containing a structural unit corresponding to monomer (a) and having a viscosity average molecular weight ranging from 5000 to 500,000, preferably from 10,000 to 100,000, and then copolymerizing the prepolymer with monomer (c) or a prepolymer containing a structural unit corresponding to monomer (c).

The method for preparing the above-mentioned copolymer provided by the present disclosure is only a preferred embodiment of the present disclosure. Actually, each of monomers (a) and (c) and optional monomer (b) can be directly used for copolymerization, without being subject to pre-polymerization. The cationic copolymer of the present disclosure can also be obtained through such a method.

Preferably, monomer (c) can be pre-polymerized to form a prepolymer containing the structural unit corresponding to monomer (c) and having a viscosity average molecular weight ranging from 10,000 to 1,500,000, preferably from 50,000 to 500,000, and then block copolymerizing the prepolymer with the prepolymer containing the structural unit corresponding to monomer (a) to form the copolymer.

In the preparation method of the present disclosure, it is preferred that, monomer (c) is not used in the steps of forming the pre-polymer containing the structural unit corresponding to monomer (a).

In the method for preparing the copolymer of the present disclosure, preferably, the amounts of cationic monomers (a) and (b) are 5-25%, and 0.01-20% by weight of the total amount of the co-monomers, respectively.

The present disclosure further provides a lost circulation additive. The lost circulation additive, based on the total weight thereof, comprises 0.1-5 wt % of the cationic copolymer of any one of claims 1 to 8, or the cationic copolymer prepared by the method according to any one of claims 9 to 12, 1-15 wt % of a filler, 0.1-5 wt % of a cross-linking agent, and 1-5 wt % of a reology control agent, preferably 0.5-2 wt % of the cationic copolymer, 1-10 wt % of the filler, 0.1-2 wt % of the cross-linking agent, and 1-4 wt % of a reology control agent. In one specific embodiment, said filler is a metal carbonate, preferably at least one selected from calcium carbonate, magnesium carbonate, and zinc carbonate; said cross-linking agent is a polyamine compound, preferably at least one selected from the group consisting of hexamethylenetetramine, diethylenetriamine, and triethylene tetramine; and said reology control agent is clay, preferably kaolin and/or bentonite.

In the present disclosure, the filler used is preferably a meal carbonate, which can fill an underground void and adjust the specific gravity of the lost circulation additive, etc. Meanwhile, a carbonate can be dissolved well in an acid, and thus can be removed through acid pickling after drilling. Specifically, the filler is preferably one or more selected from the group consisting of calcium carbonate, magnesium carbonate, and zinc carbonate. Furthermore, the average particle size of the filler is preferably in a range from 0.02 to 0.1 μm.

The cross-linking agent used in the present disclosure is a polyamine compound. A cross-linking reaction between the cross-linking agent and a cationic copolymer which can be carried out at a certain temperature enables linear macromolecules in the phase of the lost circulation additive to connect with each other so as to form a macromolecule network, thus becoming a gel with good plugging performances. In particular, the cross-linking agent used in the present disclosure is preferably one or more selected from the group consisting of hexamethylenetetramine, diethylenetriamine, and triethylene tetramine. In the case that a lost circulation additive comes across and is mixed with a drilling fluid underground, besides neutral reaction, a cross linking reaction may occur in the mixed liquor due to relatively high temperatures in underground formation, which causes the mixed liquor to form a space grid structure and thus performs the function of plugging quickly.

The reology control agent used in the present disclosure is preferably clay, more preferably kaolin and/or bentonite. For example, when bentonite is used as the reology control agent, because the content of sodium or calcium contained in bentonite plays a great role on the performance of bentonite itself, besides ordinary bentonite, there are modified sodium-based bentonite, calcium-based bentonite, and the like which has higher contents of sodium, calcium, and the like. The above-mentioned bentonite used in the present disclosure includes the ordinary bentonite, calcium-based bentonite, sodium-based bentonite, and the like. The preferred can be selected according to the specific use conditions. In the present disclosure, the reology control agent can adjust the rheological property of the system with the aid of thickening effect which is produced by the clay dispersed into water. Depending on the drilling fluid used in plugged wells and the property of water at the location of the plugged zone, there are different kinds of bentonite that can be selected to increase viscosity.

Preferably, the zeta potential of the lost circulation additive of the present disclosure is in a range from 1 to 50 mV, more preferably from 4 to 40 mV.

The present disclosure further provides a method of preparing the lost circulation additive as described above, comprising dissolving the cationic copolymer into water prior to addition of a reology control agent and a filler, after evenly dispersion, adding a cross-linking agent, and then continuing to stir to make the cross-linking agent completely dissolved, to obtain the lost circulation additive.

The present disclosure further provides use of the lost circulation additive in conjunction with an anionic drilling fluid in well drilling. In oil and gas drilling, the commonly used drilling fluid is an anionic system, which has a zeta potential of about −40 mV. The higher the negative zeta potential of the drilling fluid is, the more capable it will be in dispersing clay. Generally, after the drilling fluid and the formation water (fresh water) mix, the drilling fluid is diluted, which reduces the viscosity and flow resistance of the drilling fluid and thus increases the losses of the drilling fluid. After being mixed, the cationic chemical lost circulation additive of the present disclosure and the drilling fluid quickly react with each other, to form a grid structure which stays unmoved, thereby achieving the purpose of stopping lost circulation.

Specially, when a cationic chemical lost circulation additive is used to stop leakage, the cationic lost circulation additive is injected around a zone of the wellbore where lost circulation occurs with a drill rod. After entering cracks or caverns, the cationic lost circulation additive is mixed with an anionic drilling fluid therein, rapidly causing chemical reactions such as neutralization reaction, and cross-linking and curing reaction. As a result, the viscosity of the system increases drastically to form a space net structure, causing the cationic lost circulation additive to remain in the leakage zone and become a blocking body which can completely block off the leakage region, thus effecting on plugging leakage paths and improving loading capacity of the formations in lost circulation zones.

The molecular structure of the cationic copolymer involves a cationizable and cross-linkable group, a strong hydrophilic group, and the like. Accordingly, when the cationic copolymer is dissolved in an aqueous solution, not only both the solubility and extension of the polymer molecule can be maintained, but also the Zeta potential of the solution may become a positive value due to the hydration or salvation effect. In case the cationic chemical lost circulation additive is mixed with a drilling fluid, the Zeta potential of the mixed system can be increased, which leads to reduction of the dispersion force of the drilling fluid and thus effects on leaking stoppage. Theoretical study and experiments demonstrate that, the larger zeta potential difference between the cationic chemical lost circulation additive and the drilling fluid (typically the Zeta potential is about −40 mV), the better effect of leaking stoppage is.

The cationic chemical lost circulation additive of the present disclosure can be used depending upon the drilling fluid actually used and underground conditions in construction. Different formulations of the lost circulation additive can be selected and tested in field, and the lost circulation additive can be mixed with a drilling fluid in a selected suitable ratio, in order to stop leaking.

When used in the construction of leaking stoppage, the cationic chemical lost circulation additive provided herein is mixed with an anionic drilling fluid at a section of the wellbore where lost circulation occurs. And then neutral reaction and cross linking reaction occur, so that the viscosity of the resulting mixture rapidly increases to form a space grid structure. This prevents the mixture from moving, thereby blocking off the leakage path, and meanwhile improving the loading capacity of the lost circulation zones.

After being mixed with a drilling fluid, the cationic chemical lost circulation additive of the present disclosure enables the zeta potential of the resulting mixture to be 10 mV higher than that of the drilling fluid, and thus significantly reduces the dispersive capacity of the drilling fluid. This lost circulation additive has the characteristics of shorter time-consuming and high efficiency. The time of leaking stoppage can be more than 50% shorter than the conventional time of leaking stoppage, and the loading capacity can be up to 12 MPa/m. Furthermore, the lost circulation additive of the present disclosure has simple composition, and its raw materials can be easily obtained. The lost circulation additive does not contain any toxic ingredient or produce any side effects on environment or human beings. The preparation method of the lost circulation additive is easy to operate, and stable. Moreover, the construction of leaking stoppage with this lost circulation additive is easy and simple to handle.

The lost circulation additive of the present disclosure can be widely used in the construction operations in plugging serious leakage formations, such as lower pressure formation, fracture formation, cavernous formation, karst cave formation that are encountered during oil drilling or other drilling constructions, and therefore has apparent social and economic significance.

DETAILED DESCRIPTION OF THE EMBODIMENTS

The present disclosure will be further explained by the following specific examples. However, the scope of the present disclosure is not to be limited by these examples. The viscosity average molecular weights of the copolymers in the examples of the present disclosure were measured according to the method of GB/T 12005.10-1992.

Example 1

This example illustrates steps of preparing cationic copolymer (A), wherein raw materials 1, 2, 3, and 4 were used to represent cationic monomer (a), non-cationic monomer (c), the initiator in the redox initiation system, and the oxidant and reductant in the redox initiation system, respectively.

Specifically, raw material 1 was 50 g of p-propenylbenzyldimethylethyl ammonium chloride. Raw material 2 was a total of 950 g of non-cationic monomers containing 850 g of acrylamide and 100 g of tert-butyl acrylate. Raw material 3 was an ethanol-water solution of azodiisobutyronitrile, which was prepared by dissolving 1.8 g of azodiisobutyronitrile in 400 g of an ethanol-water solution having an ethanol concentration of 50 wt %. Raw material 4 was an ethanol-water solution containing potassium persulfate and sodium sulfoxylate formaldehyde, which was prepared by dissolving 1.8 g of potassium persulfate and 3.2 g of sodium sulfoxylate formaldehyde in 100 g of an ethanol-water solution having an ethanol concentration of 10 wt %.

The reaction steps were shown as follows. 1) All raw material 1, 40 g of raw material 3, and 40 g of raw material 4 were first mixed with 50 g of aqueous solution of ethanol with the ethanol concentration of 40 wt % and then put into a reactor. Next, the reactor was placed in an ice water bath for polymerization, to produce a prepolymer having a viscosity average molecular weight of $7.9 \times 10^4$. 2) All raw material 2, 100 g of raw material 3, and 20 g of raw material 4 were mixed with 400 g of aqueous solution of ethanol with the ethanol concentration of 40 wt % and then put into another reactor. Next, this reactor was placed in an ice water bath for polymerization to produce a prepolymer having a viscosity average molecular weight of $4.5 \times 10^5$. 3) The prepolymer obtained from step 1) was added into the reactor of step 2) which contained the prepolymer. Then, the reactor of step 2) was put into an ice water bath and the resulting mixture in the reactor was stirred. After that, the rest of raw material 3 was dropped into the reactor over 2 h, and then the rest of raw material 4 was evenly added into the above reactor over 1 h. 4) After the ice water bath was removed, the resulting mixture was further stirred for 4 h, adjusted until a neutral pH was obtained, and then dried and grounded, to obtain said cationic copolymer (A). It was known through measurement that said cationic copolymer (A) prepared in this example had a viscosity average molecular weight of $8.5 \times 10^6$.

Example 2

This example illustrates steps of preparing cationic copolymer (B), wherein raw materials 1, 2, 3, and 4 were used to represent cationic monomer (a) and cationic monomer (b), non-cationic monomer (c), the initiator in the redox initiation system, and the oxidant and reductant in the redox initiation system, respectively.

Specifically, raw material 1 comprised 150 g of cationic monomers including 100 g of p-vinyl-2,6-dimethylbenzyldimethylethyl ammonium chloride (i.e. cationic monomer (a)) and 50 g of methylbutyryloxyethyltrimethyl ammonium chloride (i.e. cationic monomer (b)). Raw material 2 comprised 550 g of acrylamide and 300 g of tert-butyl methacrylate, in total of 850 g of non-cationic monomers. Raw material 3 was an ethanol-water solution of azodiisobutyronitrile, which was prepared by dissolving 1.8 g of azodiisobutyronitrile in 400 g of ethanol-water solution having an ethanol concentration of 50 wt %. Raw material 4 was an ethanol-water solution containing potassium persulfate and sodium sulfoxylate formaldehyde, which was prepared by dissolving 2.4 g of potassium persulfate and 3.6 g of sodium sulfoxylate formaldehyde in 100 g of ethanol-water solution having an ethanol concentration of 10 wt %.

The reaction steps were shown as follows. 1) All raw material 1, 100 g of raw material 3, and 50 g of raw material 4 were first mixed with 150 g of an aqueous solution of ethanol with the ethanol concentration of 40 wt % and then put into a reactor. Next, the reactor was placed in an ice water bath for polymerization, to produce a prepolymer having a viscosity average molecular weight of $6.2 \times 10^4$. 2) All raw material 2, 100 g of raw material 3, and 20 g of raw material 4 were mixed with 200 g of an aqueous solution of ethanol with the ethanol concentration of 40 wt % and then put into another reactor. Next, this reactor was placed in an ice water bath for polymerization to produce a prepolymer having a viscosity average molecular weight of $3.1 \times 10^5$. 3) The prepolymer obtained from step 1) was added into the reactor of step 2) which contained the prepolymer. Then, the reactor of step 2) was put into an ice water bath and the resulting mixture in the reactor was stirred. After that, the rest of raw material 3 was dropped into the reactor over 2 h, and then the rest of raw material 4 was evenly added into the above reactor over 1 h. 4) After the ice water bath was removed, the resulting mixture was further stirred for 4 h, adjusted until a neutral pH was obtained, and then dried and grounded, to obtain said cationic copolymer B. It was known through measurement that said cationic copolymer (B) prepared in this example had a viscosity average molecular weight of $6.2 \times 10^6$.

Example 3

This example illustrates steps of preparing cationic copolymer (C), wherein raw materials 1, 2, 3, and 4 were used to represent cationic monomer (a) and cationic monomer (b), non-cationic monomer (c), the initiator in the redox initiation system, and the oxidant and reductant in the redox initiation system, respectively.

Specifically, raw material 1 was comprised of 300 g of cationic monomers including 200 g of N,N,N-trimethyl-2-(2-amino-4-(2-methyl-1-propenyl)-6-hydroxybenzene)ethyl ammonium chloride (i.e. cationic monomer (a)) and 100 g of methylacryloxyethyltrimethyl ammonium chloride (i.e. cationic monomer (b)). Raw material 2 comprised 400 g acrylamide and 300 g of tert-butyl methacrylate, in total of 700 g of non-cationic monomers. Raw material 3 was an ethanol-water solution of azodiisobutyronitrile, which was prepared by dissolving 2.4 g of azodiisobutyronitrile in 400 g of ethanol-water solution having an ethanol concentration of 50 wt %. Raw material 4 was an ethanol-water solution containing potassium persulfate and sodium sulfoxylate formaldehyde, which was prepared by dissolving 3.6 g of potassium persulfate and 4.8 g of sodium sulfoxylate formaldehyde in 100 g of an ethanol-water solution having an ethanol concentration of 10 wt %.

The reaction steps were shown as follows. 1) All raw material 1, 200 g of raw material 2, 60 g of raw material 3, and 40 g of raw material 4 were first mixed with 200 g of an aqueous solution of ethanol with the ethanol concentration of 40 wt %, and then put into a reactor. Next, the reactor was placed in an ice water bath to perform polymerization for 1 h. 2) The rest of raw materials 2, and 3 were mixed with 200 g of an aqueous solution of ethanol having an ethanol concentration of 40 wt %, and then the resulting mixture was dropped into the reactor over 4 h. 3) The rest of raw material 4 was mixed with 100 g of an aqueous solution of ethanol having an ethanol concentration of 40 wt %, and then the resulting mixture was evenly added to the above reactor over 1 h. 4) After the ice water bath was removed, the resulting mixture was further stirred for 4 h, adjusted until a neutral pH was obtained, and then dried and grounded, to obtain said cationic copolymer C. It was known through measurement that said cationic copolymer (C) prepared in this example had a viscosity average molecular weight of $4.0 \times 10^6$.

Example 4

This example illustrates steps of preparing cationic copolymer (D), wherein raw materials 1, 2, 3, and 4 were used to represent cationic monomer (a), non-cationic monomer (c), the initiator in the redox initiation system, and the oxidant and reductant in the redox initiation system, respectively.

Specifically, raw material 1 was comprised of 250 g of cationic monomers including 200 g of p-methylpropenyl-benzylmethyldiethyl ammonium chloride (i.e. cationic monomer (a)) and 50 g of N,N,N-trimethyl-3-(2-ethyl-4-(2-methyl-1-propenyl)-6-hydroxybenzene)propyl ammonium chloride (i.e. cationic monomer (a)). Raw material 2 comprised 600 g of N,N-dimethylacrylamide and 150 g of acrylic acid, in total of 750 g of non-cationic monomers. Raw material 3 was an ethanol-water solution of azodiisobutyronitrile, which was prepared by dissolving 2.4 g of azodiisobutyronitrile in 400 g of an ethanol-water solution having an ethanol concentration of 50 wt %. Raw material 4 was an ethanol-water solution containing potassium persulfate and sodium sulfoxylate formaldehyde, which was prepared by dissolving 3.6 g of potassium persulfate and 4.8 g of sodium sulfoxylate formaldehyde in 100 g of an ethanol-water solution having an ethanol concentration of 10 wt %.

The reaction steps were shown as follows. 1) All raw material 1, 150 g of raw material 2, 60 g of raw material 3, and 40 g of raw material 4 were first mixed with 200 g of an aqueous solution of ethanol with the ethanol concentration of 40 wt %, and then put a four-mouth reactor. Next, the four-mouth reactor was placed in an ice water bath and the resulting mixture in the four-mouth reactor was stirred. After the polymerization was in dated, the rest of raw materials 2 and 3 were dropped into the four-mouth reactor over 4 h. Then, the rest of raw material 4 was evenly added to the above four-mouth reactor over 2 h. After the ice water bath was removed, the resulting mixture was further stirred for 4 h, adjusted until a neutral pH was obtained, and then dried and grounded, to obtain said cationic copolymer (D). It was known through measurement that said cationic copolymer (D) prepared in this example had a viscosity average molecular weight of $3.1 \times 10^6$.

Example 5

This example illustrates steps of preparing cationic copolymer (E), wherein raw materials 1, 2, 3, and 4 were used to represent cationic monomer (a), non-cationic monomer (c), the initiator in (her redox initiation system, and the oxidant and reductant in the redox initiation system, respectively.

Specifically, raw material 1 was comprised of 250 g of cationic monomers including 200 g of p-methylpropenyl-benzylmethyldiethyl ammonium chloride (i.e. cationic monomer (a)) and 50 g of N,N,N-trimethyl-3-(2-ethyl-4-(2-methyl-1-propenyl)-6-hydroxybenzene)propyl ammonium chloride (i.e. cationic monomer (a)). Raw material 2 comprised 750 g of acrylamide (i.e., non-cationic monomer (c)). Raw material 3 was an ethanol-water solution of azodiisobutyronitrile, which was prepared by dissolving 24 g of azodiisobutyronitrile in 400 g of an ethanol-water solution having an ethanol concentration of 50 wt %. Raw material 4 was an ethanol-water solution containing potassium persulfate and sodium sulfoxylate formaldehyde, which was prepared by dissolving 3.6 g of potassium persulfate and 4.8 g of sodium sulfoxylate formaldehyde in 100 g of an ethanol-water solution having an ethanol concentration of 1.0 wt %.

The reaction steps were shown as follows. 1) All raw material 1, 150 g of raw material 2, 60 g of raw material 3, and 40 g of raw material 4 were first mixed with 300 g of an aqueous solution of ethanol with the ethanol concentration of 40 wt %, and then put into a four-mouth reactor. Next, the four-mouth reactor was placed in an ice water bath and the resulting mixture in the four-mouth reactor was stirred. After the polymerization was initiated, the rest of raw materials 2 and 3 were dropped into the four-mouth reactor over 4 h. Then, the rest of raw material 4 was evenly added to the above four-mouth reactor over 2 h. After the ice water bath was removed, the resulting mixture was further stirred for 4 h, adjusted until a neutral pH was obtained, and then dried and grounded, to obtain said cationic copolymer (E). It was known through measurement that said cationic copolymer (E) prepared in this example had a viscosity average molecular weight of $2.7 \times 10^6$.

Example 6

This example illustrates steps of preparing cationic copolymer (F), wherein raw materials 1, 2, 3, and 4 were used to represent cationic monomer (a), non-cationic monomer (c), the initiator in the redox initiation system, and the oxidant and reductant in the redox initiation system, respectively.

Specifically, raw material 1 was comprised of 200 g of cationic monomers including 150 g of p-methylpropenyl-benzylmethyldiethyl ammonium chloride (i.e. cationic monomer (a)) and 50 g of N,N,N-trimethyl-2-(2-methoxy-4-(2-methyl-1-propenyl)-6-hydroxybenzene)ethyl ammonium chloride (i.e. cationic monomer (a)). Raw material 2 comprised 800 g of tert-butyl methacrylate (non-cationic monomer (c)). Raw material 3 was an ethanol-water solution of azodiisobutyronitrile, which was prepared by dissolving 2.4 g of azodiisobutyronitrile in 400 g of an ethanol-water solution having an ethanol concentration of 50 wt %. Raw material 4 was an ethanol-water solution containing potassium persulfate and sodium sulfoxylate formaldehyde, which was prepared by dissolving 3.6 g of potassium persulfate and 4.8 g of sodium sulfoxylate formaldehyde in 100 g of an ethanol-water solution having an ethanol concentration of 10 wt %.

The reaction steps were shown as follows. 1) All raw material 1, 150 g of raw material 2, 60 g of raw material 3, and 40 g of raw material 4 were first mixed with 300 g of an aqueous solution of ethanol with the ethanol concentration of 40 wt %, and then put into a four-mouth reactor. Next, the reactor was placed in an ice water bath and the resulting mixture in the reactor was stirred. After the polymerization was initiated, the rest of raw materials 2 and 3 were dropped into the four-mouth reactor over 4 h. Then, the rest of raw material 4 was evenly added to the above four-mouth reactor over 2 h. After the ice water bath was removed, the resulting mixture was further stirred for 4 h, adjusted until a natural neutral pH was obtained, and then dried and grounded, to obtain said cationic copolymer (F). It was known through measurement that said cationic copolymer (F) prepared in this example had a viscosity average molecular weight of $4.9 \times 10^6$.

Examples 7 to 11 and Comparative Examples 1 and 2

In Comparative Examples 1 and 2, polydimethyldiallyl ammonium chloride, instead of any one of the cationic copolymers prepared in the above examples, was used as a cationic polymer in a lost circulation additive. The lost circulation additive was formulated according to the composition as shown in table 1.

Examples 7 to 11 involve preparation of five lost circulation additives corresponding to cationic copolymer (A) obtained from Example 1. Five cationic chemical lost circulation additives (each in an amount of 1000 g, respectively corresponding to Examples 7 to 11) were formulated according to the formulations as shown in table 1. The specific steps were as follows. Into a 2500 ml beaker which was provided with a cantilever stirrer was added water at an amount in accordance with table 1, and then the stirrer was started at a rotate speed of 450 r/min. Cationic copolymer (A) at an amount as shown in table 1 was added and stirred for 2 hours, so as to be dissolved. Then, bentonite, and calcium carbonate having an average particle size of 0.06 μm were added successively, and stirred, so that they were dispersed uniformly. Next, hexamethylenetetramine was added, and stirred for 1 hour, to obtain the viscous cationic chemical lost circulation additives of Examples 7 to 11.

TABLE 1

| | Cationic polymer (g) | Calcium carbonate (g) | Hexamethylene-tetramine (g) | Bentonite (g) | Water (g) |
|---|---|---|---|---|---|
| Example 7 | 1 | 20 | 1 | 30 | 948 |
| Example 8 | 5 | 10 | 5 | 40 | 940 |
| Example 9 | 10 | 150 | 10 | 10 | 820 |
| Example 10 | 20 | 50 | 20 | 50 | 860 |
| Example 11 | 50 | 100 | 50 | 20 | 780 |
| Comparative Example 1 | 100 | 150 | 10 | 10 | 730 |
| Comparative Example 2 | 10 | 150 | 10 | 10 | 820 |

In order to test the effects of pressure-bearing and leaking stoppage of said five lost circulation additives in above Examples 7 to 11 and Comparative Examples 1 to 2, 1000 ml of a conventional anionic polysulfonate drilling fluid was formulated in the present disclosure. Said anionic polysulfonate drilling fluid comprised 0.7 wt % of anionic polymer, 0.4 wt % of potassium-polyacrylate, 0.5 wt % of sulfonated phenol formaldehyde resin, 1.0 wt % of sulfonated bitumen, 2.0 wt % of barite powder, and balanced water. The specific steps for formulating the drilling fluid were as follows. Into a 2500 ml beaker which was provided with a cantilever stirrer, was added a required amount of water, and then the stirrer was started at a rotate speed of 450 r/min. An anionic polymer (Model Number PAC141) was added at a certain ratio, and stirred for 1 hour. Then potassium-polyacrylate (Model Number KPAN), said sulfonated bitumen and said sulfonated phenol formaldehyde resin were successively added and stirred for another 1 hour. After that, the barite powder was added under stirring, to obtain a viscous anionic polysulfonate drilling fluid.

Performance parameters such as density with respect to the lost circulation additives prepared in Examples 7 to 11 and Comparative Examples 1 to 2 as well as the drilling fluid as prepared above were determined. The results were shown in table 2 (wherein the apparent viscosity was measured using a six-speed rotational viscometer at a rotate speed of 100 r/min).

TABLE 2

| | Density (g/cm$^3$) | Zeta Potential (mV) | Apparent Viscosity (mPa · s) |
|---|---|---|---|
| Drilling fluid | 1.30 | −40 | 60 |
| Example 7 | 1.08 | 4 | 37 |
| Example 8 | 1.12 | 10 | 45 |
| Example 9 | 1.30 | 17 | 50 |
| Example 10 | 1.20 | 20 | 81 |
| Example 11 | 1.23 | 26 | 76 |
| Comparative Example 1 | 1.32 | 15 | 184 |
| Comparative Example 2 | 1.26 | 5 | 42 |

Pressure-Bearing Experiment

Each of the lost circulation additives of Examples 7 to 11 and Comparative Examples 1 to 2 was mixed with the anionic polysulfonate drilling fluid in a mass ratio of 1:1. After the resulting mixture was stirred for 3 minutes at a rotate speed of 450 rpm and stood for 1 h, the zeta potential and loading capacity of the mixture were tested. The system state was observed and recorded. The results were shown in table 3.

Specifically, the system state was estimated by visual method, comprising inclining a test tube filled with a mixture of the lost circulation additive and the anion polysulfonate drilling fluid at 45 degrees, and observing the state of the liquid level over 1 min. If the liquid level failed to stay still, it was recorded as flow. If a part of the liquid level stayed still, it was recorded as drip. If the liquid level stayed still, it was recorded as non-flow. The loading capacity of formation was evaluated through a QD-2 lost circulation material tester (manufactured by Qingdao Haitongda Special instrument Co., Ltd). A steel crack was continuously pressed respectively before and after being sealed with a lost circulation additive, until it was penetrated. The pressure exerted at penetration of the steel crack was termed as loading capacity of formation.

TABLE 3

| | Zeta potential | System state | Pressure capacity (MPa/m) |
|---|---|---|---|
| Example 7 | −25 | drip | 3 |
| Example 8 | −20 | Non-flow | 5 |
| Example 9 | −15 | Non-flow | 7 |
| Example 10 | −5 | Non-flow | 10 |
| Example 11 | −1 | Non-flow | 12 |

TABLE 3-continued

|  | Zeta potential | System state | Pressure capacity (MPa/m) |
|---|---|---|---|
| Comparative Example 1 | −17 | viscous, flow | 0.2 |
| Comparative Example 2 | −24 | viscous, flow | 0 |

It can be seen from results of the pressure-bearing and leaking-stoppage experiment in table 3 that after the cationic chemical lost circulation additive provided by the present disclosure and a drilling fluid were mixed, the zeta potential of the system has significantly increased, the viscosity thereof sharply risen, and a cured state or substantially cured state formed rapidly, which enabled the loading capacity of the formation to improve significantly.

It can been seen from tables 1 to 3, when the amount of the cationic copolymer according to the present disclosure was more than 0.5% (Example 8), the system can reach a non-flow state, and at this point the loading capacity had reached 5 MPa/m. It demonstrated that, in practice, good application effect can be achieved with a small amount of the lost circulation additive. In the comparative examples, however, the loading capacity of the system was only 0.2 MPa/m even when the usage amount of the cationic polymer reached 10%. Therefore, in practice, only when a very large quantity of the lost circulation additive is used, certain leaking stoppage effect can be achieved. This indicates the cationic copolymer according to the present invention can be used at rather small amount, and thus is industrially significant.

The invention claimed is:

1. A lost circulation additive, based on the total weight of the lost circulation additive, comprising 0.1-5 wt % of a cationic copolymer 1-15 wt % of a filler, 0.1-5 wt % of a cross-linking agent, and 1-5 wt % of a rheology control agent,
wherein the cationic copolymer is represented by the following formula, having a viscosity average molecular weight in a range from 2 million to 10 million,

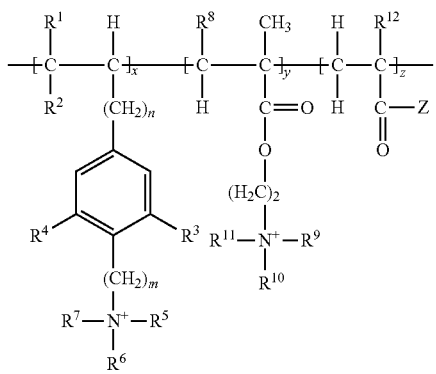

wherein $R^1$ and $R^2$ are each independently H or $CH_3$; $R^3$ and $R^4$ are each independently selected from the group consisting of H, $C_1$-$C_4$ alkyl, $NH_2$, OH, and $OCH_3$; $R^5$, $R^6$ and $R^7$ are each independently $C_1$-$C_2$ alkyl, and at least one of $R^5$, $R^6$ and $R^7$ is $CH_3$; n is 1, 2 or 3, and m is 1, 2, 3 or 4; $R^8$ is H or $CH_3$; $R^9$, $R^{10}$, and $R^{11}$ are independently $C_1$-$C_2$ alkyl, and at least one of $R^9$ to $R^{11}$ is $CH_3$; $R^{12}$ is H or a $C_1$-$C_4$ alkyl; Z is $OR^{13}$ or $NR^{14}R^{15}$, and $R^{13}$, $R^{14}$, and $R^{15}$ are each independently H or $C_1$-$C_4$ alkyl; and
wherein in the cationic copolymer, the mole fractions of three structural units corresponding to three monomers are as follows: x being in a range from 0.01 to 20%, y being in a range from 0 to 15%, and z=1−x−y.

2. The lost circulation additive according to claim 1, comprising, based on the total weight of the lost circulation additive, 0.5-2 wt % of the cationic copolymer, 1-10 wt % of the filler, 0.1-2 wt % of the cross-linking agent, and 1-4 wt % of the rheology control agent.

3. The lost circulation additive according to claim 1, wherein the cationic copolymer is prepared by a method comprising the steps of prepolymerizing monomer (a) represented by formula (I), and optional monomer (b) represented by formula (II) and monomer (c) represented by formula (III), to form a prepolymer containing a structural unit corresponding to monomer (a) and having a viscosity average molecular weight in a range from 5,000 to 500,000, and copolymerizing the prepolymer with monomer (c) or a prepolymer containing a structural unit corresponding to monomer (c),

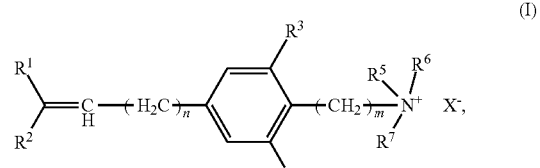

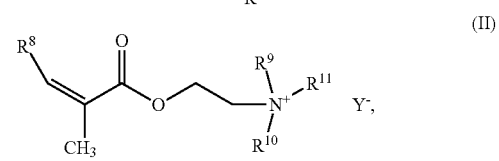

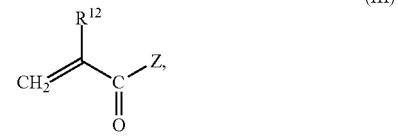

wherein X is selected from the group consisting of F, Cl, Br, and I; and Y is selected from the group consisting of F, Cl, Br and I.

4. The lost circulation additive according to claim 3, comprising, based on the total weight of the lost circulation additive, 0.5-2 wt % of the cationic copolymer, 1-10 wt % of the filler, 0.1-2 wt % of the cross-linking agent, and 1-4 wt % of the rheology control agent.

5. The lost circulation additive according to claim 1, wherein the zeta potential of a solution formed by the copolymer in deionized water and having a concentration of 1 wt % is in a range from 10 to 30 mv.

6. The lost circulation additive according to claim 1, wherein y is in a range from 0.01 to 12%.

7. The lost circulation additive according to claim 1, wherein the copolymer is prepared by block copolymerizing cationic monomer (a), non-cationic monomer (c), and optionally cationic monomer (h), and the chemical structure of a haloid in cationic monomer (a) is shown as formula (I):

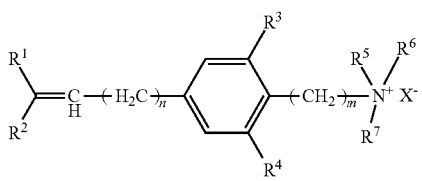

(I)

wherein X is selected from F, Cl, Br, and I.

8. The lost circulation additive according to claim 7, wherein the compound as shown in formula (I) is at least one selected from the group consisting of p-propenylbenzyldimethylethyl ammonium chloride, p-vinyl-2,6-dimethylbenzyldimethylethyl ammonium chloride, p-methylpropenylbenzyltrimethyl ammonium chloride, p-methylpropenylbenzylmethyldiethyl ammonium chloride, N,N,N-trimethyl-2-(2-amino-4-(2-methyl-1-propenyl)-6-hydroxylbenzene)ethyl ammonium chloride, N,N,N-trimethyl-3-(2-amino-4-(2-methyl-1-propenyl)-6-hydroxybenzene)propyl ammonium chloride, N,N,N-trimethyl-2-(2,6-dihydroxy-4-(2-methyl-1-propenyl)benzene)ethyl ammonium chloride, N,N,N-trimethyl-2-(2-methoxy-4-(2-methyl-1-propenyl)-6-hydroxybenzene)ethyl ammonium chloride, N,N,N-trimethyl-2-(2-propyl-4-(2-methyl-1-propenyl)-6-hydroxybenzene)ethyl ammonium chloride, N,N,N-trimethyl-2-(2-ethyl-4-(2-methyl-1-propenyl)-6-hydroxybenzene)ethyl ammonium chloride, N,N,N-trimethyl-3-(2-ethyl-4-(2-methyl-1-propenyl)-6-hydroxybenzene)propyl ammonium chloride, and N,N,N-methyldiethyl-3-(2-ethyl-4-(2-methyl-1-propenyl)-6-hydroxybenzene)propyl ammonium chloride.

9. The lost circulation additive according to claim 7, wherein the chemical structure of a haloid in cationic monomer (b) is shown as formula (II):

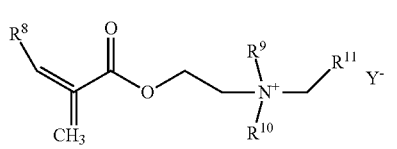

(II)

wherein Y is selected from the group consisting of F, Cl, Br and I; and wherein the compound of formula (II) is selected from the group consisting of methylbutyryloxyethyltrimethyl ammonium chloride, methylacryloxyethyltrimethyl ammonium chloride, and methylacryloxyethylmethyldiethyl ammonium chloride.

10. The lost circulation additive according to claim 7, wherein the chemical structure of non-cationic monomer (c) is shown as formula (III):

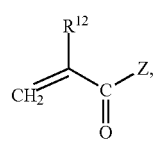

(III)

wherein the non-cationic monomer is at least one selected from the group consisting of acrylamide, N,N-dimethylacrylamide, N,N-methylethylacrylamide, acrylic acid, tert-butyl acrylate, methyl methylacrylate, and tert-butyl methyl acrylate.

11. The lost circulation additive according to claim 10, wherein, the non-cationic monomer (c) comprises at least one non-cationic monomer (c1) in which Z is $OR^{13}$, and one non-cationic monomer (c2) in which Z is $NR^{14}R^{15}$, and wherein non-cationic monomer (c1) is 50% or less by weight of the total amount of non-cationic monomers.

12. The lost circulation additive according to claim 1, wherein the filler is a metal carbonate; the cross-linking agent is a polyamine compound; and the rheology control agent is clay.

13. The lost circulation additive according to claim 12, wherein the metal carbonate is selected from the group consisting of calcium carbonate, magnesium carbonate, and zinc carbonate; the cross-linking agent is selected from the group consisting of hexamethylenetetramine, diethylenetriamine, and triethylene tetramine; or the rheology control agent is kaolin or bentonite.

14. The lost circulation additive according to claim 1, wherein the zeta potential of the lost circulation additive ranges from 1 to 50 mV.

15. The lost circulation additive according to claim 1, wherein the cationic copolymer has a viscosity average molecular weight in a range from 4 million to 8 million.

16. The lost circulation additive according to claim 1, wherein n is 1.

17. The lost circulation additive according to claim 1, wherein the cationic copolymer comprises a structural unit corresponding to p-propenylbenzyldimethylethyl ammonium chloride.

18. The lost circulation additive according to claim 1, wherein the cationic copolymer is a block copolymer of p-propenylbenzyldimethylethyl ammonium chloride and acrylamide.

19. The lost circulation additive according to claim 3, the method further comprising the step of prepolymerizing monomer (c) to form a prepolymer containing a structural unit corresponding to monomer (c) and having a viscosity average molecular weight in a range from 10,000 to 1,500,000, followed by block copolymerization of such prepolymer with the prepolymer containing the structural unit corresponding to monomer (a) to form the copolymer.

20. The lost circulation additive according to claim 3, wherein monomer (c) is not used in the step of forming the prepolymer containing the structural unit corresponding, to monomer (a).

21. The lost circulation additive according to claim 3, wherein the amount of cationic monomer (a) used is 5-25% by weight of the total amount of the comonomers, and the amount of cationic monomer (h) used is 0.01-20% by weight of the total amount of the comonomers.

* * * * *